July 28, 1959   K. C. KING   2,896,776
HARVESTER
Filed May 14, 1957   2 Sheets-Sheet 1
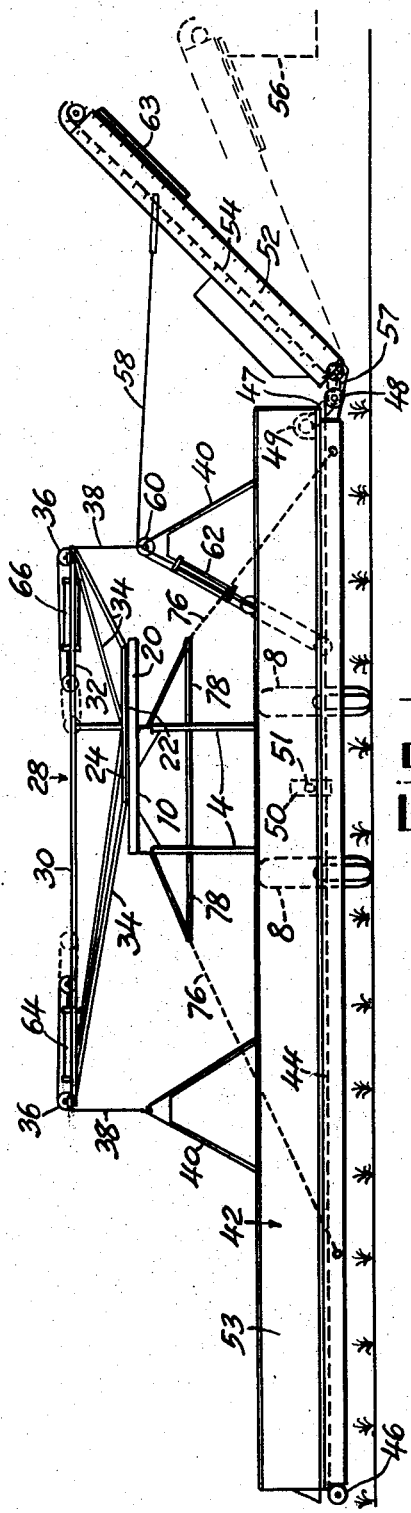
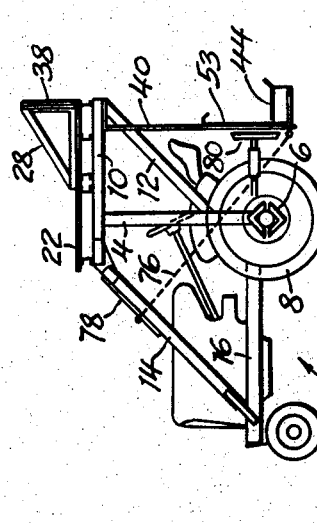
INVENTOR.
KARL C. KING
BY Albert Sperry.
ATTORNEY

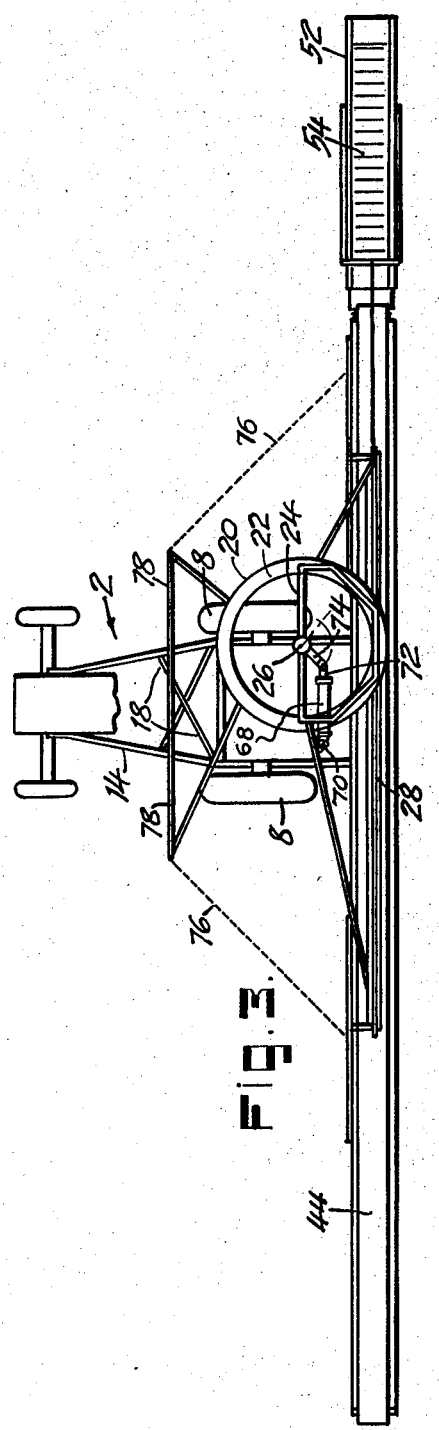

United States Patent Office 2,896,776
Patented July 28, 1959

2,896,776

HARVESTER

Karl C. King, Morrisville, Pa.

Application May 14, 1957, Serial No. 659,029

4 Claims. (Cl. 198—233)

This invention relates to harvesting equipment and is directed particularly to constructions embodying a conveyor designed to extend transversely across several rows of crops and upon which vegetables, fruit or the like may be placed by pickers moving along the rows behind the equipment.

Harvesting equipment having a conveyor extending across rows of vegetables or other crops is of great value in harvesting operations since a number of pickers can walk behind the conveyor and place or toss the vegetables into the conveyor as the equipment moves along the rows in a field. The conveyor may then discharge the vegetables into a truck so that the harvesting of crops and the loading of trucks can be accomplished rapidly and with a minimum of time and expense.

While such equipment has many advantages, constructions of this type as heretofore produced have been very cumbersome and difficult to handle particularly if traveling over rough or uneven ground. Moreover, when the length of the transverse conveyor is great enough to attain a high degree of efficiency in operation, the equipment is so wide that it is often difficult or impossible to turn it around in the space available at the ends of the rows. Furthermore, equipment of such width cannot be transported on the highways, and as a result, its use is generally limited to a few very large and closely adjacent fields.

In accordance with the present invention, these objections and limitations in harvesting equipment of the prior art are overcome and constructions are provided whereby an extended transverse conveyor may be used, whereas manipulation and turning of the equipment is simplified and movement of the equipment along highways is rendered possible.

These advantages are preferably attained by providing the equipment with a support from which the conveyor is suspended and by employing means which permit movement of the conveyor from a transverse harvesting position to a longitudinal traveling position wherein the overall width of the equipment is materially reduced. The equipment preferably is constructed so as to be attachable to a tractor and driven from the usual power take-off thereof, but it may, if desired, be provided with its own power means so as to be constructed as a single unit.

The principal object of the present invention is to facilitate the movement and handling of harvesting equipment having a conveyor adapted to extend transversely across a number of rows of crops.

A further object of the invention is to provide harvesting equipment with a conveyor movable in a manner to facilitate manipulation and transport of the equipment.

Another object of the invention is to provide harvesting equipment with a conveyor which is movable from a transverse harvesting position in which it extends across several rows of crops to a longitudinal transport position in which the overall width of the equipment is materially reduced.

These and other objects and features of the present invention will appear from the following description thereof wherein reference is made to the figures of the accompanying drawings.

In the drawings:

Fig. 1 is a rear view of a typical form of equipment embodying the present invention with the conveyor in its normal harvesting position;

Fig. 2 is a side view of the construction illustrated in Fig. 1;

Fig. 3 is a top plan view of the construction shown in Fig. 1; and

Fig. 4 is a diagrammatic plan view of the construction shown in Fig. 1 illustrating a typical manner of handling the equipment in turning about at the end of a field.

In that form of the invention chosen for purposes of illustration in the drawings, the harvesting equipment is designed to be applied to a tractor indicated generally at 2. The construction embodies a framework including uprights 4 located at opposite sides of the tractor adjacent the rear thereof and provided at their lower ends with clamping means 6 adapted to be secured in place about the axle of the rear wheels 8 of the tractor. The upper ends of the uprights 4 are secured to a horizontal platform 10 near the front portion thereof, whereas inclined braces 12 are secured at their upper ends to the rearwardly projecting portion of the platform. Front braces 14 are secured to the front portion of the platform 10 and are secured at their lower ends to the frame 16 of the tractor by bolts or other suitable fastening means. Cross braces may be provided at suitable points as shown at 18 so as to strengthen the assembly.

The platform 10 is thus held in an elevated position and projects rearwardly beyond the tractor. Further, the platform includes an extending portion 20 which projects sideways to the right, as seen in Fig. 3, so that it extends beyond the side of the tractor and is elevated some distance above the wheels thereof. A circular track 22 is mounted on the platform 10 and is off-set laterally with respect to the longitudinal axis of the tractor. The track 22 thus projects beyond the rear and beyond one side of the tractor as shown in Fig. 3.

A carriage 24 is mounted for movement on the track 22 and about the center 26 of the track as a pivot point. An extended cross member 28 is supported by the carriage 24 and extends in opposite directions therefrom. The arm 30 of the cross member is preferably somewhat longer than the arm 32 and both arms are braced from the carriage 24 by struts 34 which serve to hold the arms extended in substantially horizontal positions.

Pulleys or sheaves 36 are located at the opposite outer ends of the arms 30 and 32 and cables 38 extend over the sheaves and downward to hangers 40 by which a horizontal conveyor frame 42 is carried. A horizontal conveyor 44 is mounted on the frame 42 and passes about the rollers 46 and 48 at opposite ends of the conveyor frame. The conveyor 44 is preferably driven by belt or chain 47 from a hydraulic motor 49 supplied with liquid from a pump 50 driven by the conventional power take-off 51 of the tractor. Motor 49 is driven in such a direction that the upper run of the conveyor moves to the right as seen in Figs. 1 and 3 of the drawings. A backboard 53 carried by the conveyor frame extends upward in front of the conveyor 44 so that the conveyor is exposed to the rear, enabling pickers moving along the rows of crops behind the conveyor, to toss vegetables onto the conveyor without danger of their rolling off the opposite side of the conveyor to be lost.

The right hand end of the conveyor frame 42 as seen in Fig. 1 has an inclined conveyor frame 52 pivotally connected thereto and extending upward therefrom. An elevating conveyor 54 is mounted on the inclined conveyor frame 52 in position to receive vegetables or fruit from the horizontal conveyor 42 to discharge them from the upper end thereof into the body of a truck 56. The elevating conveyor may also be driven by the hydraulic motor 49 through the belt or chain 57. The angle of inclination of inclined frame 52 and conveyor 54 can be varied by adjustment of a cable 58 secured at one end near the outer end of the inclined frame 52 and passes over a roller 60 to a suitable hydraulic device 62 supplied with fluid from pump 50. The inclination of the elevating conveyor and the position of the upper end thereof can thus be varied as required depending upon the height of the side walls of the truck. The outer end of the elevating conveyor may be provided with rollers or other means 63 adapted to engage the side wall of the truck 56 so as to prevent drag upon the conveyor upon irregular movement of the truck and harvester.

The horizontal conveyor 44 and the elevating conveyor 54 are both supported by the cables 38 which pass over the sheaves 36 on the ends of the arms 30 and 32 of the cross member 28. The horizontal conveyor 44 therefore may extend to the left of the center line of the tractor a greater distance than to the right so as to balance the weight of the elevating conveyor connected to the right hand end of the horizontal conveyor frame 42. The cables 38 which support the conveyor assembly pass over the sheaves 36 to adjusting means such as the hydraulic cylinders 64 and 66 supplied with fluid from the pump 50. The cylinders can thus be regulated or held in fixed position as required to maintain the horizontal conveyor in a level position and at any desired elevation. Thus, the conveyor may be raised or lowered when traveling over uneven ground or the whole conveyor assembly may be raised or lowered as required for use or travel under any conditions presented. Furthermore, the outer end of the inclined conveyor frame 52 and elevating conveyor 54 may be raised upward when necessary to shorten the assembly or to aid in balancing the equipment when turning or moving over rough fields or when traveling along a highway.

The conveyor assembly and cross member 28 are supported by the carriage 24 which is mounted for movement on the track 22 on the platform 10 of the framework. The conveyor assembly can therefore be rotated horizontally about the point 26 as a center from the transverse harvesting position shown in full lines in Fig. 4 to the longitudinal traveling position shown in dotted lines therein. Such rotation of the carriage, cross member and conveyor assembly is preferably effected by means of a hydraulic device such as the cylinder 68 which is pivotally secured at 70 to the platform 10 and has a piston rod 72 pivotally connected to arm 74 on the carriage 24. Operation of the hydraulic device 68 therefore serves to rotate the carriage, cross member and conveyor assembly so that they will be located at one side and parallel to the tractor when in the traveling position, whereas movement of the assembly from one position to another can be effected without interfering with the operation of the tractor.

The relatively free movement of the conveyor assembly afforded by the suspension thereof from the cross member 28 has the advantage of permitting the conveyor assembly to yield in the event it should engage a stump in a field or strike against a pole, tree or other obstacle in turning or manipulating the equipment. However, in order to prevent excessive swinging or rocking of the assembly, ropes 76 or yieldable springs, shock absorbers or snubbers can be connected to the horizontal conveyor frame 42 and to the arms 78 secured to the frame 18 of the tractor or elsewhere so as to hold the conveyor assembly stable in substantially any desired position to which it may be moved. An additional yieldable bumper device 80 may also be positioned at the rear of the tractor frame as shown in Fig. 2 to limit the swinging of the conveyor assembly. If necessary, the snubbers may be disconnected during movement of the conveyor assembly to and from its traveling position but this will generally depend upon the manner in which the snubbers are connected to the horizontal conveyor frame and to other elements of the equipment.

In using the equipment described during harvesting operations, the tractor 2 will travel along and over one or more rows of the crops being harvested with the wheels of the tractor between the rows as in normal operation. The horizontal conveyor 44 at such times will be in its normal transverse harvesting position shown in full lines in Fig. 4 in which the conveyor extends transversely beyond the tractor and across several rows of crops. The pickers can then follow behind the harvesting equipment, picking the vegetables and tossing them onto the horizontal conveyor 44 for delivery to the elevating conveyor 54 to be discharged into the body of the truck 56 movable along adjacent rows.

When the harvesting equipment reaches the end of the rows being harvested, it will, of course, be necessary to turn the equipment about in order that it may travel in the opposite direction along adjacent unharvested rows of the crops. In normal farming practice, the space available at the ends of the rows is generally about twenty feet, whereas the length of the horizontal conveyor 44 in a typical construction may be thirty-eight feet and the inclined conveyor 54 may extend another six or eight feet beyond the end of the horizontal conveyor. The total width of the harvesting equipment, when in its harvesting position, therefore, may be forty-five or fifty feet. It obviously would be difficult, if not impossible, to turn such equipment within the normal twenty foot clearance at the ends of the rows of a field. However, when using equipment embodying the present invention, the hydraulic device 68 may be actuated when the equipment reaches the ends of the rows whereby the carriage 24 is rotated about the center 26 of the track 22 and the conveyor assembly is thereby moved from its transverse harvesting position to its longitudinal traveling position as shown in dotted lines in Fig. 4. The conveyor assembly will then be positioned substantially parallel with the longitudinal axis of the tractor. As such times, the conveyor assembly may be raised if desired, so that the horizontal conveyor 44 will be elevated above the wheels of the tractor. The inclined conveyor 54 also may be raised to draw its outer end upward and inward to reduce the over-all length of the conveyor assembly if desired. The forward end of the conveyor assembly will then project only a limited distance beyond the front of the tractor as shown in Fig. 4 whereupon the tractor and harvesting equipment may be turned as shown at 82 in Fig. 4. As the tractor continues to turn back toward the unharvested rows of the crops, the conveyor assembly is swung back to its normal transverse harvesting position as shown at 84 so that the equipment may travel back over unharvested rows in the field to harvest the crops in the adjacent rows.

When the equipment is to be moved along a highway, the conveyor assembly is moved to its longitudinal traveling position and may be raised above the tractor wheels whereby the overall width of the assembly will be materially reduced and wil not greatly exceed the width of the tractor itself. The equipment, therefore, can travel along conventional highways without occupying undue space or blocking traffic.

The construction described is simple and economical to manufacture and is highly efficient in the harvesting of crops. At the same time, the equipment can be moved readily and safely through fields and over comparatively rough ground and yet it can be turned and manipulated easily despite the relatively great width thereof when in its normal harvesting position.

The manner of suspending, raising, lowering and turning the conveyor assembly and the particular forms and types of power units employed for this purpose are obviously capable of numerous variations and changes to meet any particular harvesting conditions. Any preferred type of conveyor used also may be used in the assembly. Furthermore, the equipment may be applied to conventional tractors and can be driven from the power take-off of the tractor or in any other suitable manner. On the other hand, if desired, the equipment may be fixedly secured to a tractor or other power source so as to provide a complete and unitary structure.

The means employed for rotating the platform and conveyor assembly into and out of the harvesting and longitudinal positions also can be varied if desired, whereas the construction and form of the framework and other parts of the equipment can be changed to provide the desired balance and ease of manipulation needed for any usage of the equipment.

These and other changes and modifications may be made in the form, construction and arrangement of the elements of the combination as desired. In view thereof, it should be understood that the particular embodiment of the invention shown in the drawings and described above is intended to be illustrative only and is not intended to limit the scope of the invention.

I claim:

1. A harvester comprising a tractor, a framework extending upward from the tractor and having a platform adjacent the top thereof, a circular track on said platform, a carriage movable on said track about the center thereof, suspending means carried by said carriage, a horizontal conveyor supported by said suspending means and movable thereby to selected elevated positions, an elevating conveyor extending upward from adjacent one end of the horizontal conveyor for discharging crops received from the horizontal conveyor into a truck, and means for moving said carriage and both said conveyors about the center of said track from a harvesting position in which the horizontal conveyor extends transversely with respect to the longitudinal axis of the tractor to a traveling position in which the horizontal conveyor extends substantially parallel to the longitudinal axis of the tractor.

2. A harvester comprising a tractor, a framework extending upward from the tractor and having a platform adjacent the top thereof, a circular track on said platform, a carriage movable on said track about the center thereof, suspending means carried by said carriage, a horizontal conveyor supported by said suspending means and movable thereby to selected elevated positions, an elevating conveyor extending upward from adjacent one end of the horizontal conveyor for discharging crops received from the horizontal conveyor into a truck, means for moving said carriage and both said conveyors about the center of said track from a harvesting position in which the horizontal conveyor extends transversely with respect to the longitudinal axis of the tractor to a traveling position in which the horizontal conveyor extends substantially parallel to the longitudinal axis of the tractor, and hydraulic means powered by the tractor for moving said carriage, suspending means and conveyors.

3. A harvester comprising a wheeled support movable over a field to be harvested, a carriage rotatably mounted on said support for movement about a vertical axis, a conveyor movable with said carriage from a harvesting position in which it extends transversely of the longitudinal axis of the support at the rear thereof with the ends of the conveyor projecting beyond the opposite sides of the wheeled support to a travel position in which the conveyor is located at one side of the longitudinal axis of the wheeled support and generally parallel thereto, and flexible supporting means extending downwardly from said carriage and connected to the conveyor near the opposite ends thereof providing a yieldable connection between the wheeled support and both ends of the conveyor.

4. A harvester of the character defined in claim 3 wherein adjusting means are connected to said flexible supporting means and operable to selectively raise or lower either or both ends of said conveyor.

References Cited in the file of this patent

UNITED STATES PATENTS

| | | |
|---|---|---|
| 2,005,442 | Spiegl | June 18, 1935 |
| 2,321,387 | Jackson | June 8, 1943 |
| 2,576,992 | Bainbridge et al. | Dec. 4, 1951 |
| 2,782,943 | Jones et al. | Feb. 26, 1957 |